Feb. 12, 1957 P. AGRILLO 2,781,083
SPRING STRUCTURE
Filed July 22, 1952
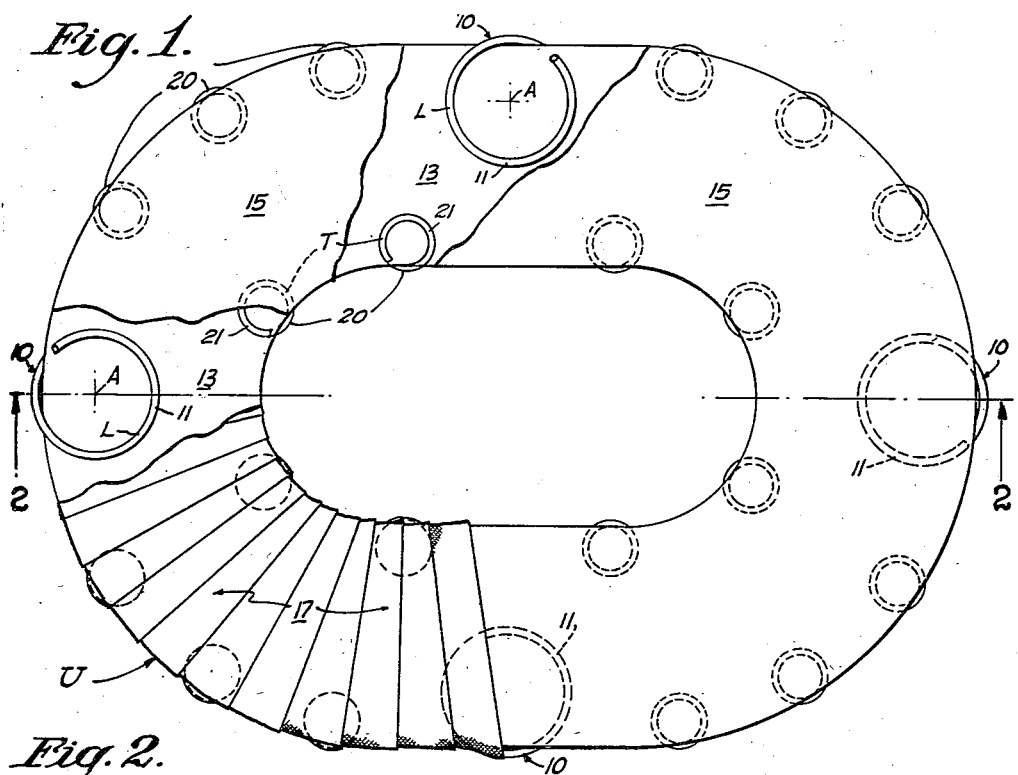
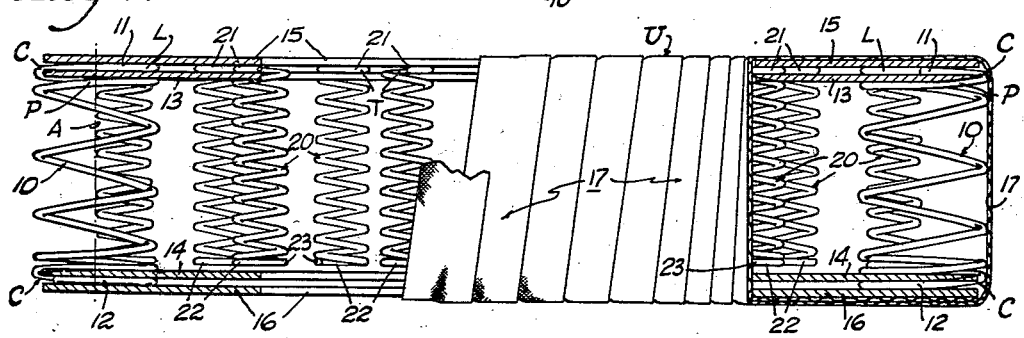
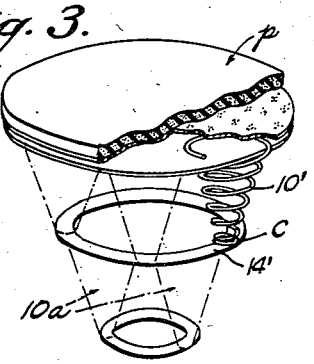
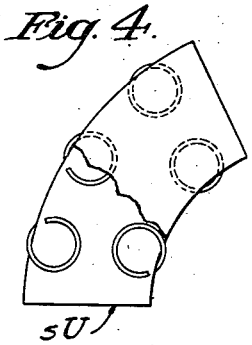
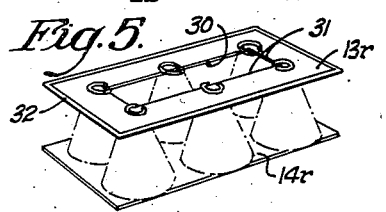
INVENTOR:
Paul Agrillo
BY
Hansen & Lane
ATTORNEYS.

United States Patent Office 2,781,083
Patented Feb. 12, 1957

2,781,083

SPRING STRUCTURE

Paul Agrillo, Gilroy, Calif.

Application July 22, 1952, Serial No. 300,200

3 Claims. (Cl. 155—179)

This invention relates to spring structures and more particularly to seat cushions and the like in which springs are employed.

Broadly speaking the use of springs in cushions is not basically new as is evidenced by the numerous uses of such structure in the art of upholstery. This invention, however, contemplates a novel arrangement of a plurality of springs in a single unit or a plurality of units combined in a simple yet effective and efficent manner.

It has been found that spring wire of relatively small diameter takes tempering better and will last longer than larger diameter spring wire. In other words, during the tempering process it takes longer for heat to reach the heart of wire of larger cross section than it does for the same heat to penetrate wire of smaller diameter. Consequently, since larger diameter wire must be subjected to heat for longer periods during tempering, it becomes more brittle particularly in the region of its outer surface strata and therefore is more likely to crystallize from repeated stressing and relaxing under continued use.

In addition to the foregoing it has been discovered that less material, by weight, is required to make, say five 20 pound capacity, small springs arranged in a given area than it does to make a single larger spring occupying that same area and having the same load bearing capacity, i. e. 100 pounds.

With the foregoing in mind this invention contemplates building up a spring unit consisting of a plurality of small springs, of whatever capacity is desired, arranged in shapes suitable to conform to seat pads or cushions of various designs.

One object of this invention is to provide a single diaphragm or web of any suitable flexible material such as cardboard, thin metal or the like cut to the shape desired and utilizing the end most convolutions of the several small springs for securing the springs to such diaphragm or web to produce the spring units contemplated by this invention.

Another object is to provide multiple units in which several sub-assemblies of springs with one set of diaphragms are superimposed one over another and united to each other by the securing effect of the endmost convolutions of adjoining sets of springs in each subassembly of such spring units.

Another object is to provide each spring unit with a binding or covering for concealing the several springs employed therein as well as for maintaining the several springs and the diaphragms to which they are secured in a compact unit which can be easily handled and combined with like units to form a complete seat cushion.

Another object is to adhere to each compact or bound unit a pliable or yieldable coating such as sponge rubber or the like whereby one or several units can be cemented to a top sheet of finished cushioning such as sponge rubber, foam rubber or the like.

These and other objects and advantages of the present invention will become apparent from a reading of the following description and claims in the light of the drawings in which:

Fig. 1 is a plan view of one form of a single unit embodying the present invention, parts being broken away for purposes of illustration.

Fig. 2 is a section through Fig. 1 taken substantially along line 2—2 thereof.

Fig. 3 is a perspective view of another form of unit embodying the present invention but employing conical springs in lieu of the cylindrical type shown in Figs. 1 and 2.

Fig. 4 is a modification of the form shown in Figs. 1 and 2 in that one segment of a larger or multiple unit is illustrated in Fig. 4.

Fig. 5 is modification of that form of spring unit which is illustrated in Figs. 3 and 1.

In general each spring unit U or subassembly thereof comprises a plurality of helically coiled springs 10 each having its ends 11 and 12 secured to an upper diaphragm 13 and/or a lower diaphragm 14; a covering 15 and 16 for the upper and lower diaphragms 13 and 14, respectively; and a binding or closure 17 for such unit or subassembly thereof.

More specifically the helical springs 10 are of the type in which at least the last two or endmost convolutions C at each of its ends 11 and 12 are in abutting relation, i. e. in substantially parallel relation with respect to each other to form what is generally known as dead convolutions. This is advantageous for several reasons, mainly to facilitate a gripping action by the two equi-diametered dead convolutions C relative to the diaphragms. Also, these dead convolutions C are disposed at a right angle with respect to the axis A of the helically coiled spring to thereby present spring ends which conform in disposition to the plane in which the diaphragms lie.

In addition to the foregoing it will be noted that certain intermediate or secondary springs 20 are shorter than the primary springs 10. In this connection the primary springs have their dead ends C secured to both upper and lower diaphragms whereas the secondary springs 20 have only one end 21 connected to a diaphragm, preferably the upper one 13 so as to be suspended therefrom. In this manner, the opposite end 22 of each secondary spring is disposed in spaced relation with respect to the lower diaphragm 14. Thus the dead convolutions 23 at the end 22 of the shorter springs 20 come into play only after the primary springs 10 are compressed a predetermined distance. Since the dead end convolutions 23 at the free ends of the shorter springs 20 eventually engage the lower diaphragm 14, the importance of their presenting spring ends which lie parallel to such diaphragm is now believed to be apparent.

Referring now to the various figures in the drawing it will be seen that the diaphragms 13 and 14 can be made in various shapes to suit different purposes. In all cases, however, the general arrangement and manner of assembly is the same in that the primary coil springs 10 have their dead convoluted ends C grippingly secured to the upper and lower diaphragms 13 and 14, respectively. As best shown in Figs. 1 and 2, the terminal or last convolute L of either end of the primary springs is disposed adjacent the outer surface of the diaphragm to which it is attached. It will thus be seen that the two diaphragms 13—14 are maintained in spaced relation a distance determined by the distance between the penultimate convolutes P at each end of these springs 10.

The intermediate or secondary springs 20 likewise have their terminal convolutes T overlying the upper diaphragm 13. Since terminal convolutes are disposed on the outer sides of the diaphragms 13 and 14, particularly the upper diaphragm should be covered with an overlying sheet, 15—16 respectively, of material which is similar on character to that used for the main or spring supporting diaphragms. It should here be noted that the diaphragms 13—14 and the coverings 15—16 therefor are preferably cardboard of sufficient thickness to maintain their stiffness. However, these diaphragms and covers can be made of metal or any other material suitable to maintain that stiffness required.

The foregoing elements are preferably bound with cloth such as muslin which in the case of the form shown in Figs. 1 and 2 consists of a ribbon wound about the sub-assembly of springs, diaphragms and covers therefor. In this manner, the units are complete for installation as a sub-structure for a seat cushion, the upper surface of which is padded in any well known manner during upholstery of the seat in which they are employed.

As hereinbefore mentioned the units U may be constructed in various forms to suit different purposes. Exemplifications of variations in form are illustrated in Figs. 3, 4 and 5. In Fig. 3, there is shown an arrangement embodying the same principle as illustrated in Figs. 1 and 2 but in Fig. 3 the springs 10' are of the frusto-conical type instead of cylindrical. Moreover, the lower diaphragm 14' is a simple flat metallic ring of sufficient width to be received between the dead convolutions C. In this form shown in Fig. 3 an additional stratum of springs 10a is employed, they being fewer in number than those used in the upper strata. Although the springs 10a shown have their larger ends secured to the ring 14' it will be obvious that their smaller ends may be grippingly connected to the ring 14' to create a diabolo shaped unit.

As illustrated in Fig. 3 the unit therein is provided with a sponge rubber pad p which overlies the upper cover 15 and is secured thereto by rubber cement or the like.

In Fig. 4 there is shown a portion of a unit or sub-assembly sU in which the diaphragm is a solid strip, i. e. with no central opening. This form of sub-unit sU can be square, rectangular, or arcuate as shown. In the case of the arcuate form, several such sub-assemblies sU can be laid side by side to form a spring for a complete circular seat such as one built around a column. These arcuate forms can also be joined to form a serpentine seat or a half circle booth seat.

In Fig. 5, a rectangular form of unit R is shown. This form has an open center 30 the marginal edges 31 of which are disposed between the two final, dead convolutions, C'. In this form, the diaphragms 13r and 14r are formed of metal and have a bead 32 formed on their outer edge or perimeter. These metal diaphragms 13r—14r should be covered with a cardboard sheet such as the ones 15—16 shown in Fig. 2, which sheets will have their outer edges disposed within the boundary defined by the beads 32 on the two diaphragms. To this may be added a sponge rubber pad as in the case of the form shown in Fig. 3 to complete the unit for use in a cushion.

From the foregoing it will be seen that I have provided a spring structure and sub-assemblies thereof which are economically manufactured in that less spring metal, by weight, is required to provide a load bearing capacity comparable to that provided by larger springs occupying a similar area. Since the smaller springs employed in my spring units are better tempered they will not be subject to spring fatigue as would larger springs of like capacity.

In addition to the primary springs being sufficient to hold a normal load of, say, a person weighing up to 200 pounds, the provision of the secondary springs so disposed as to pick up any additional load serve to save the primary springs from undue or excessive loading. This takes the strain off the primary springs when a person weighing over 200 pounds is disposed on the unit and thereby saves these primary springs from losing their rebound, i. e. becoming subject to spring fatigue.

While I have described the foregoing structure in specific detail it will be apparent that the same can be altered, varied and/or modified without departing from the spirit of my invention. I therefore desire to avail myself of all modifications, variations and/or alterations as fairly come within the purview of the appended claims.

What I claim and desire to protect by Letters Patent is:

1. A spring structure comprising a plurality of helically coiled springs having at least two equidiametered dead convolutions at each of their ends, said dead convolutions being disposed at right angles with respect to the axes of said springs, and adapted to receive a diaphragm of flexible material with the marginal edges thereof disposed between the last and penultimate ones of said dead convolutions.

2. A spring structure comprising a plurality of helically coiled springs each having at least two equidiametered dead convolutions at each of its ends disposed at right angles to the axes of said springs and in mutually abutting relation, whereby each end of each of said springs is adapted to receive a flexible diaphragm having its marginal edges inserted between the last and penultimate dead convolutions thereof for gripping action thereby and whereby said plurality of coiled springs maintain said diaphragms in spaced relation and said diaphragms unite said plurality of springs into a single spring unit.

3. A spring structure for a seat cushion for use with a pair of diaphragms of substantially firm yet flexible material conforming in shape to each other, said structure comprising a plurality of helically coiled springs each having at least two equidiametered dead convolutions at each of its ends adapted to receive one of said diaphragms, said dead convolutions being disposed perpendicular to the axes of said coil springs for clampingly gripping said diaphragms so as to maintain said diaphragms in parallel spaced relation with respect to each other.

References Cited in the file of this patent

UNITED STATES PATENTS

| 882,654 | Smith | Mar. 24, 1908 |
| 1,963,055 | Powers | June 12, 1934 |
| 1,982,030 | Stadlter | Nov. 27, 1934 |
| 2,129,251 | Venzke | Sept. 6, 1938 |
| 2,230,109 | Gleason | Jan. 23, 1941 |
| 2,273,064 | Owen | Feb. 17, 1942 |

FOREIGN PATENTS

| 134,986 | Great Britain | Nov. 20, 1919 |
| 253,428 | Italy | June 15, 1927 |

OTHER REFERENCES

The Wm. D. Gibson Co., Catalogue No. 9, title, Springs. Copyright 1923.